May 29, 1956  G. MUFFLY  2,747,376
REVERSIBLE REFRIGERATING SYSTEMS
Filed Sept. 24, 1953  2 Sheets-Sheet 1
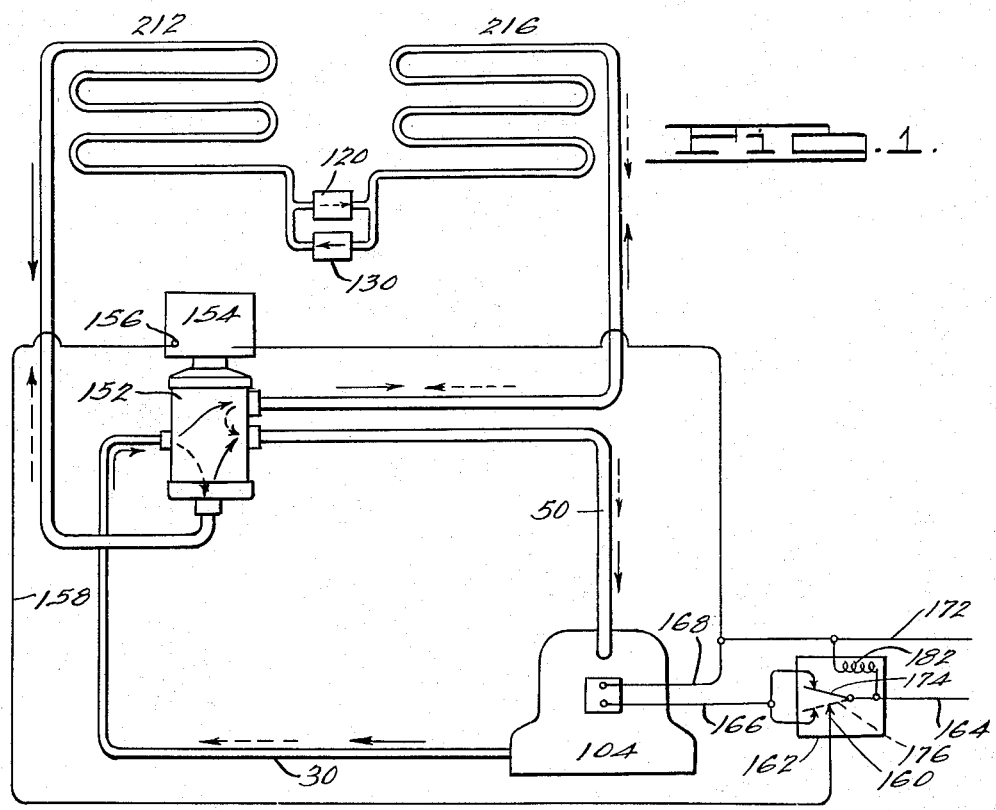
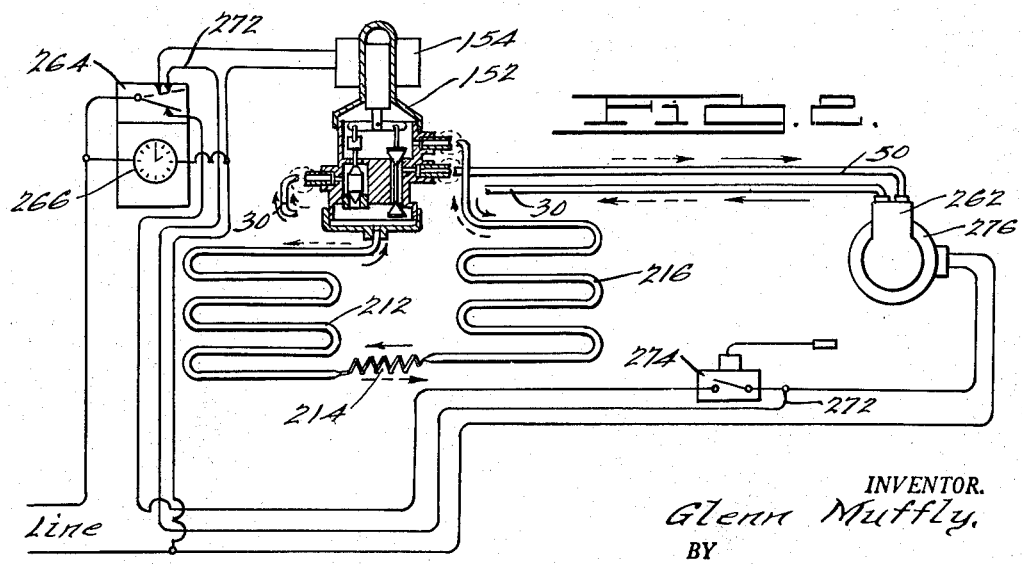
INVENTOR.
Glenn Muffly,
BY
Harness, Dickey & Pierce
ATTORNEYS.

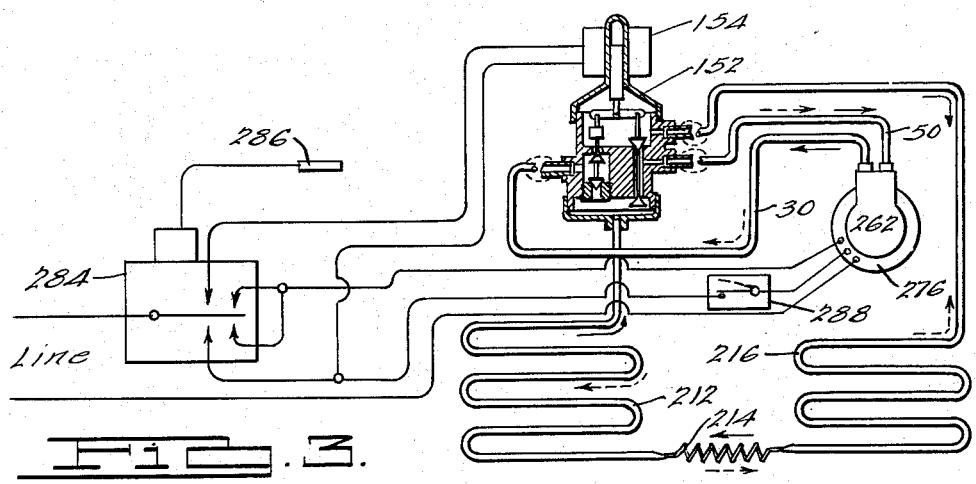
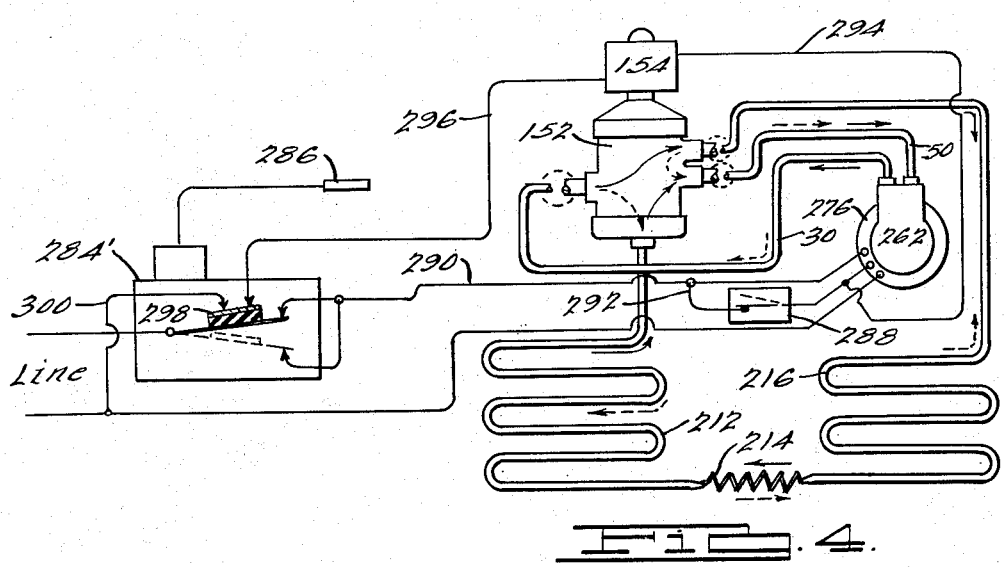
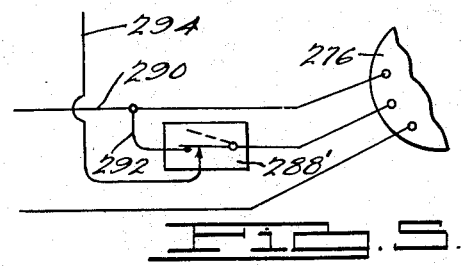

United States Patent Office 2,747,376
Patented May 29, 1956

2,747,376

REVERSIBLE REFRIGERATING SYSTEMS

Glenn Muffly, Springfield, Ohio

Application September 24, 1953, Serial No. 382,047

17 Claims. (Cl. 62—4)

This application is a continuation-in-part of my co-pending U. S. applications as follows: Serial Number 45,343, filed August 20, 1948, now Pat. No. 2,654,227; Serial Number 50,101, filed September 20, 1948, now Pat. No. 2,672,016; Serial Number 247,239, filed September 19, 1951.

This invention relates to control of reverse cycle refrigerating systems as disclosed in the above mentioned applications and in particular to the method of actuating the reversing valves of such systems.

This specification and the drawings are mainly copied from the latter two of the above applications and relate to improvements in the method of controlling reversing valves of the type disclosed in the first mentioned application. In this first application I disclosed and claimed a reversing valve for control of a cooling and heating system in which gravity causes the valves of the valve assembly to normally rest in the cooling position during idle periods and when the system is operated on the cooling cycle, but the valves are lifted by a solenoid when the control switch is closed for operation on the heating cycle. The present application covers improvements on this feature, and repeats certain disclosures of the last two applications listed above with the following objects in view:

It is an object of this invention to stop or greatly reduce the flow of current through the solenoid during operation with the valves lifted.

A further object is to provide full voltage flow of current through the solenoid during the lifting of the valves and then to stop or greatly reduce such flow.

Another object is to utilize the circuit breaker switch normally used on the motor which drives the compressor to accomplish the addtiional function of opening the circuit which has energized the solenoid during the lifting of the valves.

In the drawings:

Figure 1 is taken from Figure 4 of my U. S. application Serial Number 50,101. It shows the same control of the reversing valve but omits those parts which pertain only to ice making, with which the present application is not concerned.

Figure 2 contains features of Figure 6 of my application Serial Number 247,239, omitting the extra evaporators and the extra suction port of the compressor, with which the present application is not concerned.

Figure 3 contains features of Figure 7 of my application Serial Number 247,239, omitting the secondary system with which the present application is not concerned.

Figure 4 is a simplified version of the same Figure 7, omitting more parts and including the modification of putting the solenoid and the starting circuit in parallel, as suggested on page 11, lines 15–19 of my application Serial Number 45,343 and on page 20, lines 1–8 of my application Serial Number 247,239.

Figure 5 is a detail of Figure 4, showing two fixed contacts in the circuit breaker.

So far as possible the numerals denoting parts shown in these figures are the same as in the original applications, but to avoid duplication the numerals are raised by 100 or 200, or changed to match Figure 1, in copying from application Serial Number 247,239.

Each of the figures shows a refrigerating system of the "reverse-cycle" or "heat pump" type diagrammatically with details of the control features claimed.

As shown in Figure 1 the coil of solenoid 154 is not energized since its terminal 156 connects thru the wire 158 to the open terminal 160 of switch 162. The motor-compressor unit 104 is shown as energized by flow of current thru the line conductor 164 and thru switch 162 to motor lead 166. The other conductor 168 connected with the compressor motor is connected to the opposite line conductor 172. The valve mechanism 152 is assumed to be in the position causing flow to follow the solid arrows, which in this case indicate defrosting of the right-hand evaporator 216 and cooling of the left-hand evaporator 212.

When solenoid 154 is energized this valve mechanism will shift to the position in which refrigerant flow follows the dotted arrows, thus defrosting the left-hand evaporator and cooling the right-hand evaporator.

The switch 162 has two positions, the one shown by full line 174 and the one indicated by the dotted line 176. In either of these positions the compressor motor is energized, but only in the dotted position 176 is the solenoid 154 energized.

In Figure 2 the switch 264 is normally actuated by the clock 266 on a time cycle, but may also be operated manually when occasion requires. The lifting of this switch breaks the circuit through the switch 274 and energizes the solenoid 154 to lift the valves of 152 to their defrosting positions, as explained in the earlier application Serial Number 45,343 above mentioned. At the same time the switch closes a circuit through the wire 272 to short out the thermostatic switch 274 and start the compressor motor 276 if it is not already running. The clock mechanism allows the switch 264 to drop to the position shown at the end of a short period which is established just long enough to insure that the freezer evaporator 212 is defrosted. This allows return of the valves to their normal positions as shown, due to the combined weight of the movable parts of 152 and 154 which is ample to overcome the upward liquid pressure on the valves which were closed during the defrosting operation. As an additional provision to insure the downward movement of the valves due to gravity when the solenoid 154 is de-energized I propose to employ loose fits for lost motion in the pivots which connect these valves with the armature of solenoid 154.

Figure 3 shows a modified electrical system particularly suited for use in air conditioning or when the reverse-cycle periods are apt to last for hours instead of minutes. The switch 284 is actuated in response to temperature changes of its bulb 286, which is located in the space where temperature is to be controlled. A rise of temperature of bulb 286 moves the blade of switch 284 downwardly, thus energizing the motor 276 without energizing the solenoid 154. Thus operation of the system is started normally with flow as shown by solid arrows, causing 212 to operate as the evaporator and 216 as the condenser. When the switch blade is moved in the opposite direction, either manually or in response to a drop of temperature of the bulb 286, the motor 276 and solenoid 154 are both energized so that the flow of refrigerant follows the dotted arrows, causing 212 to function as a condenser and 216 as an evaporator, thus heating the controlled space. It will be seen however that the solenoid 154 remains energized only so long as the starting circuit breaker 288 remains closed. In this case the armature of the solenoid and the movable parts of the valve assembly 152 are made light in weight relative to valve port sizes so that the high side pressures effective on the valves by the time the circuit breaker opens will be ample to hold the valves in the positions to which they have been moved by the solenoid. Thus it is only necessary to lift the valves at the start of the run and they will thereafter be held in their lifted positions by high side refrigerant pressure until the next time the compressor is stopped. As some time will always elapse between the need for heating and the need for cooling, the pressures within the system will equalize to allow the valves to drop before the system is re-started.

The wiring of Figure 3 puts the solenoid 154 in series with the starting winding of the motor 276, which is permissible with a solenoid winding which offers little resistance to flow of current. The solenoid and the starting circuit could be wired in parallel, as they are in Figure 2, at a slight additional cost but this is not considered necessary.

Figure 4 shows this modification of Figure 3 with switch contacts so connected that the solenoid 154 is in parallel with the motor, as in Figure 2, and the starting circuit breaker 288 of Figure 3 cuts out the line voltage across the solenoid 154 as well as opening the starting circuit of the motor. This provides the full line voltage for lifting the valves when starting on one cycle (say the one for heating the space), but as soon as the starting circuit breaker 288 opens, the current flow through the solenoid drops to a minimum which is ample to hold the valves in their lifted positions, particularly since high side pressure aids in holding the closed valves closed.

The switches 284' and 288 of Figure 4 are shown in their positions at the instant of starting the motor 276 and before the starting circuit breaker 288 has opened. It will be seen that line current now flows from one side of the line through the wires 290 and 292 to the switch 288 and the starting winding of the motor back to the opposite side of the line. It also flows from the circuit breaker switch 288 in parallel through the wire 294, the solenoid 154, wire 296, insulated contact 298 and wire 300 back to the opposite side of the line.

When the circuit breaker 288 opens, at near normal running speed of the motor 276, the solenoid 154 is no longer connected across the line, but is in series with the running portion of the motor winding which has a much higher resistance than the starting winding, hence very little current flows through the solenoid winding during the run on this cycle. It is obvious that when the switch 284' is closed in its downward direction the insulated contact 298 makes no connection with wires 296 and 300, hence the solenoid carries no current.

It will be seen that Figure 4 combines Figure 4 of my copending application Serial Number 45,343 with Figure 7 of my copending application Serial Number 247,239.

Figure 5 is a modified detail of Figure 4, showing the wire 294 leading to an additional contact in the starting circuit breaker 288' instead of to the wire which connects with the starting circuit itself. This added contact represents the "slight additional cost" previously mentioned, which effects an operating economy by stopping the flow of current thru the solenoid during the run on the heating cycle as well as during the cooling cycle.

As stated in the applications from which this material is taken, the solid arrows in various figures indicate the direction of refrigerant flow for the present positions of the switches and the valve device 152 (100 in Serial Number 45,343 and 170 in Serial Number 247,239). The dotted arrows show the direction of flow in the opposite (usually the heating) position of the valve assembly. In Figure 1 the motor-compressor unit is numbered 104 as in application Serial Number 50,101. It will be understood that this is equivalent to the motor 276 and compressor 262 of Figures 2, 3 and 4. Other numerals shown for comparison with the earlier applications are 30 for the discharge tube leading from the compressor, 50 for the suction tube, 120 and 130 for the expansion valves of Figure 1 and 214 for the restrictor tube of Figures 2, 3 and 4, it being understood that the restrictor 214 might replace the two expansion valves in Figure 1. The coil 182 of Figure 1 indicated a clock motor in the original application, Serial Number 50,101, but is not essential to this application.

A feature explained in the earlier applications and not copied fully here is the fact that the valves of the assembly 152 are all held in their closed positions by high side pressure, hence it is only necessary to apply power to lift them at the start of a run on one (usually the heating) cycle and they remain in this position during the balance of that run. When a start is made on the normal (usually the cooling) cycle the valves remain in the position which they had assumed during the idle period, hence it is not necessary to energize the solenoid 154 for such a start. It was also explained in the previous applications that the moving parts of the valve assembly can, if desired, be made heavy enough to drop under the force of gravity before the high and low side pressures equalize, but that action is not required in connection with the present application.

It will be understood that the "reverse cycle" features of this application can be employed in what is known as a "heat pump" system and also in systems where the object is to heat an evaporator for a shorter period merely to defrost it or to release ice from a surface upon which it has been frozen.

While Figures 4 and 5 are new they are drawn from the original figures and specifications of the parent applications, which disclose the features of these figures.

It will be understood that the starting circuit breaker of the motor may be operated by any of the known methods, including response to changes of speed, heat, voltage, amperage, torque, pressure, time, etc. and that any method which causes the circuit breaker to open soon after the starting of the motor will serve the purpose of also opening or increasing the resistance in the circuit which supplies the power to actuate the valve mechanism.

To summarize, the five figures show the flow of current as follows:

|  | Current Through Solenoid During— | | | |
| --- | --- | --- | --- | --- |
|  | Start on Cooling | Run on Cooling | Start on Heating | Run on heating |
| Fig. 1 | None | None | In parallel with motor. | In parallel with motor. |
| Fig. 2 | do | do | do | Do. |
| Fig. 3, plain circuit breaker. | do | do | Series with starting winding. | None. |
| Fig. 4, plain circuit breaker. | do | do | In parallel with starting winding. | Series with running winding. |
| Fig. 5, 2-pole circuit breaker. | do | do | do | None. |

The designs illustrated by the drawings herewith may be modified or combined in many ways, as will be apparent to one skilled in this art, hence applicant wishes the following claims to be understood as comprehending such modifications.

I claim:

1. In a refrigerating system of the reversible heat pump type including a compressor and a motor to drive the same, valve means controlling a plurality of ports and operable to reverse the flow of refrigerant in a part of said system, electrical means for actuating said valve means, and a multiple-throw switch for connecting a source of current with said motor and with said electrical means, said switch including contacts to close two parallel circuits at one throw whereby one of said circuits energizes said motor while the other circuit energizes said electrical means, the other throw of said switch being arranged to energize said motor while the circuit of said electrical means remains open.

2. In a refregerating system employing a volatile refrigerant, a compressor, a motor arranged to drive said compressor and including a starting circuit, a circuit breaker for opening said starting circuit after the motor has started, valve means for shifting the path of flow of said refrigerant, and electrical means controlled by said circuit breaker for actuating said valve means.

3. In a refrigerating system employing a volatile refrigerant, a compressor, a motor arranged to drive said compressor, a starting circuit breaker switch for said motor, a valve for shifting the path of flow of said refrigerant, electrically actuated means controlled by said switch for moving said valve in one direction, and means effective upon a drop of pressure in said system when the compressor is stopped for returning said valve to its original position.

4. In a refrigerating system employing a volatile refrigerant, a compressor for circulating said refrigerant, an electric motor for operating said compressor, a starting circuit breaker for said motor, a heat exchanger, reversing means for changing the flow path of said refrigerant to reverse the operation of said heat exchanger with respect to the absorption or dissipation of heat, and a switch for starting and stopping said motor, said switch having a part movable to either of two positions, in one of which positions said reversing means is energized through said starting circuit breaker while the motor starting circuit is also energized and in the other of which said motor is energized and the reversing means is not energized.

5. In a refrigerating system, an electric motor having a starting circuit, an evaporator, valve means for causing said evaporator to be heated by operating temporarily as a condenser, electrically actuated means for operating said valve means, a starting circuit breaker for said motor, and a second pair of contacts of which one is moved by operation of said circuit breaker, said contacts controlling the circuit through said electrically actuated means, the last said circuit being in parallel with the starting circuit winding of said motor.

6. In a refrigerating system, an evaporator, an electric motor, a starting circuit in said motor, a circuit breaker switch in said circuit, a valve device for causing said evaporator to function as a condenser, electrically actuated means for operating said device, and means forming an electrical circuit in series through said circuit breaker and said electrically actuated means.

7. In a refrigerating system, an evaporator, a compressor, an electric motor for driving said compressor, a starting circuit breaker for said motor, a switch having two positions in either of which said motor is energized, a valve device for causing said evaporator to function as a condenser while said switch is set at one of said positions, and means for closing an electrical circuit for actuation of said valve device simultaneously with the closing of said switch in one of said positions, said circuit breaker then acting to open the last said circuit.

8. In a refrigerating system, an evaporator, a compressor, an electric motor for driving said compressor, a switch having two positions in either of which said motor is energized, a starting circuit breaker for said motor, a refrigerant flow reversing valve mechanism for causing said evaporator to function as a condenser, and electrical means for actuating said mechanism by the flow of current through said switch in one of its positions and through said circuit breaker.

9. In a refrigerating system designed to circulate a heat transfer fluid, an electric motor, a control switch having two contact-closing positions either of which causes said motor to operate, a starting circuit breaker for said motor, an electrically actuated device for modifying the path of circulation of said fluid, and electrical contact means closed by said switch in one of said two positions to complete a circuit through said circuit breaker and said electrically actuated device.

10. In a heat-pump system, an electric motor having a starting circuit breaker, a device for reversing heat flow in said system, an electrically actuated power element for operating said device, and a control for starting said system on either its heating or its cooling cycle of operation, said control including means operated when starting on one of said cycles to connect said power element in series with said circuit breaker and thereby momentarily energize said power element to actuate said reversing device.

11. In a refrigerating system charged with a volatile refrigerant, an evaporator, a compressor, an electric motor, a starting circuit breaker for said motor, valve means for causing said evaporator to function temporarily as a condenser for the purpose of heating it, an electrical power element for operating said valve, and electrical conductors connecting said power element with said circuit breaker and with one side of the electric power supply line, whereby the current input to said element is sharply reduced when said circuit breaker opens as the motor approaches its normal running speed.

12. In a refrigerating system employing an evaporative refrigerant, an electric motor associated with said system and having a running winding and a starting winding, a starting circuit breaker for said motor, a heat exchanger forming a part of said system and adapted to act either as an exaporator or as a condenser, a refrigerant flow control device for causing said heat exchanger to thus reverse its function, an electrical power element for actuating said device, and electrical conductors connecting said power element with the motor side of said circuit breaker and with one side of the power supply line which leads to said motor, whereby said power element is momentarily in parallel with the motor starting winding as the motor is started and then, upon opening of the starting circuit breaker, it is in series with the running winding of the motor.

13. In a refrigerating system employing an evaporative refrigerant, an electric motor associated with said system and having a starting circuit breaker, a heat exchanger forming a part of said system and connected therein for operation either as an evaporator or as a condenser, a valve mechanism for causing said heat exchanger to reverse its operation as above, and an electrical power element for actuating said mechanism, said element being connected in parallel with said motor while the motor is being started and the circuit of said element being opened by the opening of said starting circuit breaker.

14. In a refrigerating system employing an evaporative refrigerant, an evaporator, a compressor, an electric motor, a starting circuit breaker for said motor, a valve device for causing said evaporator to function temporarily as a condenser to heat it, an electrical power element for actuating said mechanism, and an additional electrical contact for said starting circuit breaker, said power element being electrically connected between said contact and one pole of the motor, whereby said element is connected in parallel with the starting circuit of the motor while the circuit breaker is closed and disconnected while the circuit breaker is open.

15. In a refrigerating system, an evaporator, a condenser, a motor for supplying power to operate said system, a starting circuit breaker for said motor, a valve mechanism for causing said evaporator to act as a condenser while the first said condenser acts as an evaporator, and an electrical power element for actuating said mechanism, said element being energized by a flow of current in parallel with the flow of current through said motor only while said starting circuit breaker is closed.

16. In a refrigerating system of the reversible heating or cooling type employing a heat carrying fluid, a device for circulating said fluid, a heat exchanger adapted for either absorbing or dissipating heat according to whether said system is operating on a cooling cycle or a heating cycle, refrigerant flow modifying means for shifting the opertion of said system from heating to cooling and vice versa, an electrical power element for actuating said flow modifying means, and a control device having two operative positions including one in which only the device for circulating is energized and another in which the circulating device is energized and said power element is energized by a parallel electrical circuit.

17. In a refrigerating system of the reversible heat pump type, a heat exchanger adapted to be selectively heated or cooled by means of a volatile fluid, a control device for shifting said heat exchanger selectively to its heating or cooling cycle of operation, an electrical element for actuating said control, a motor having a starting circuit breaker, and means forming an electrical circuit in series through said circuit breaker and said electrical element for the purpose of energizing the latter.

References Cited in the file of this patent
UNITED STATES PATENTS

| | | |
|---|---|---|
| 2,351,140 | McCloy | June 13, 1944 |
| 2,451,385 | Groat | Oct. 12, 1948 |
| 2,525,560 | Pabst | Oct. 10, 1950 |